(12) United States Patent  
Chan et al.

(10) Patent No.: US 8,459,913 B2  
(45) Date of Patent: Jun. 11, 2013

(54) METHOD AND SYSTEM OF SECURING CARGO

(75) Inventors: Hanson How Sin Chan, Hong Kong (HK); Sai Ho Simon Leung, Hong Kong (HK)

(73) Assignee: Cathay Pacific Airways Limited, Hong Kong (HK)

( * ) Notice: Subject to any disclaimer, the term of this patent is extended or adjusted under 35 U.S.C. 154(b) by 100 days.

(21) Appl. No.: 13/160,523

(22) Filed: Jun. 15, 2011

(65) Prior Publication Data

US 2012/0027535 A1 Feb. 2, 2012

(30) Foreign Application Priority Data

Jul. 28, 2010 (HK) .................................. 10107239.4

(51) Int. Cl.  
*B60P 7/08* (2006.01)

(52) U.S. Cl.  
USPC ................ 410/97; 410/46; 410/104; 410/118

(58) Field of Classification Search  
USPC ............... 410/46, 96, 97, 100, 104, 116, 117, 410/118; 87/2, 12; 206/597; 248/499  
See application file for complete search history.

(56) References Cited

U.S. PATENT DOCUMENTS

| 4,270,657 | A | | 6/1981 | Bayon | |
| 6,152,664 | A | * | 11/2000 | Dew et al. | ..................... 410/100 |
| 6,866,453 | B2 | * | 3/2005 | Looker et al. | ................... 410/96 |

FOREIGN PATENT DOCUMENTS

| CN | 2225992 | 5/1996 |
| CN | 2465985 | 12/2001 |
| EP | 1606143 B1 | 3/2007 |
| WO | 02/062619 | 8/2002 |

\* cited by examiner

*Primary Examiner* — Stephen Gordon  
(74) *Attorney, Agent, or Firm* — Eagle IP Limited; Jacqueline C. Lui

(57) ABSTRACT

A method and system of securing cargo for preventing access to cargo during transportation is disclosed. In an embodiment, the system comprises a security net adapted for covering the cargo, the net comprising a panel with a periphery. The panel is made from a net with holes of sufficiently small size to prevent objects from readily being inserted therethrough without causing a tear thereto. The periphery contains a plurality of openings. The system also comprises a plurality of security locks adapted for locking onto a pallet beneath the cargo and coupling onto one of the plurality of openings. Each security lock has a first identifier for identifying whether the plurality of security locks belong to a predetermined set.

10 Claims, 5 Drawing Sheets

METHOD AND SYSTEM OF SECURING CARGO

FIELD OF INVENTION

This invention relates to a method and system of securing cargo, in particular a method and system for preventing access to cargo during transportation.

BACKGROUND OF INVENTION

Conventional methods and systems of securing cargo for freight forwarding typically uses a network of bands to secure cargo onto a pallet. This may raise security issues during transportation.

SUMMARY OF INVENTION

In the light of the foregoing background, it is an object of the present invention to provide an alternate system for secure transportation of cargo.

Accordingly, the present invention, in one aspect, is a system comprising a security net adapted for covering the cargo, the net comprising a panel with a periphery. The panel is made from a net with holes of sufficiently small size to prevent objects from readily being inserted therethrough without causing a tear thereto. The periphery contains a plurality of openings. The system also comprises a plurality of security locks adapted for locking onto a pallet beneath the cargo and coupling onto one of the plurality of openings. Each security lock has a first identifier for identifying whether the plurality of security locks belong to a predetermined set.

In an exemplary embodiment of the present invention, the system further comprises a plurality of coupling members. Each coupling member coupling one of the plurality of security locks to one of the plurality of openings. Each coupling member has a second identifier for identifying whether the plurality of coupling members belongs to the predetermined set.

In a further embodiment, the coupling member is in an open position before use and is adapted to close to an irreversible closed position to ensure detection of any unauthorized opening.

According to another aspect of the present invention, a method for preventing access to cargo during transportation is disclosed. The method comprises the steps of setting the cargo onto a supporting pallet and covering the cargo with a security net. The net comprises a panel with a periphery, and the panel is made from a net with holes of sufficiently small size to prevent objects from readily being inserted therethrough without causing a tear thereto. The periphery of the security net is then coupled to the pallet using a locking system with unique identification, the lock adapted to break when tampered with. After transfer, the user then checks for the integrity of the lock and the security net, and verifies the identification before removing said net from the cargo.

There are many advantages to the present invention. One advantage is that the small holes of the security net, combined with the security locks, prevents foreign objects from being inserted to the cargo during transportation, either through the net or through the gap between the security net and the pallet. The use of identifiers in the security locks and/or coupling members makes it easy for a user to identify a security violation when any one of the locks/parts are being replaced by another lock/part that was originally not used, for example after a bomb is placed inside the net as part of the cargo.

Another advantage of the present invention is that the security locks and the coupling members being made of a plastic material mean that they are easily distinguishable from metal counterparts used for securing the cargo net onto the pallet. Further, it is even harder to break open a plastic part without the break being readily identifiable. Plastic is also recyclable.

DETAILED DESCRIPTION OF THE PREFERRED EMBODIMENTS

Figure 1:
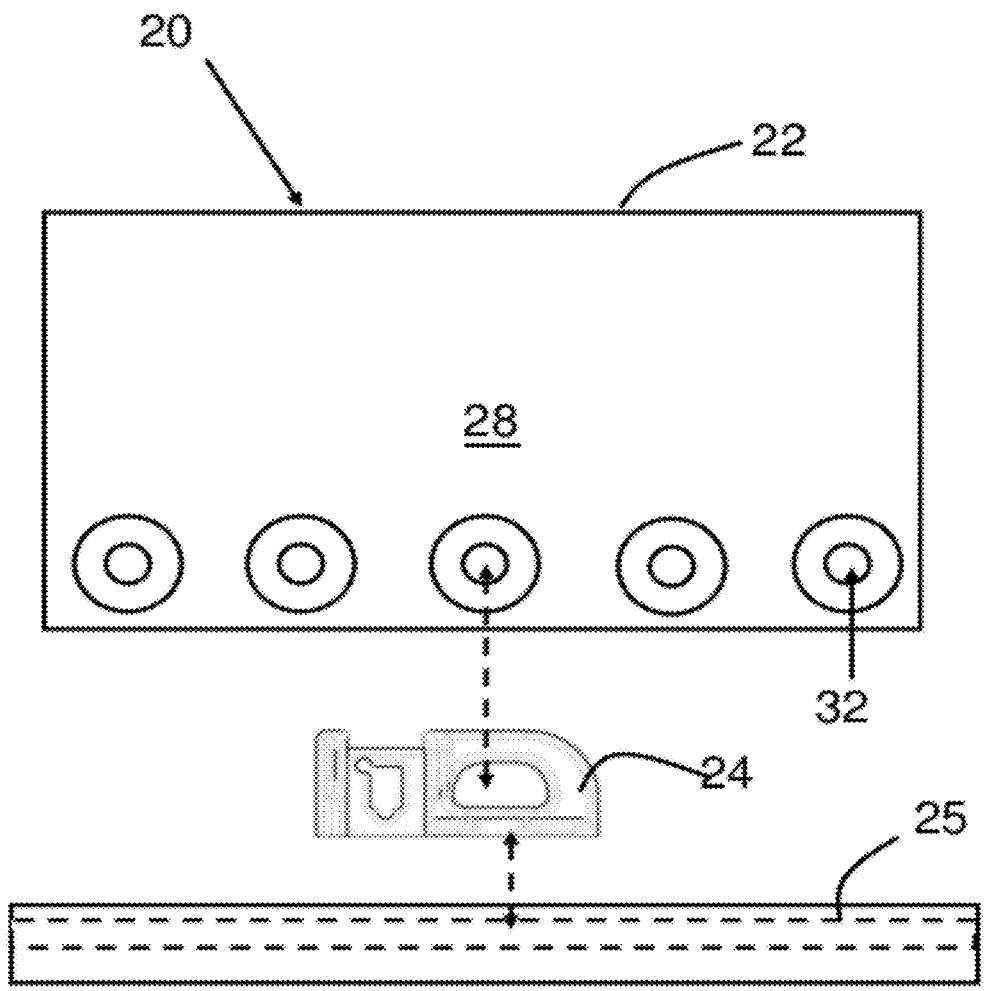
FIG. 1 is a front view of a security net system according to an embodiment of the present invention.

Referring now to FIG. 1, the first embodiment of the present invention is a security net system 20 comprising a security net 22 and a plurality of security locks 24. The security net 22 comprises a panel 28 having a periphery. The panel 28 is made from a net with holes of sufficiently small size, such that foreign objects cannot be readily inserted therethrough without causing a tear thereto. In one embodiment, the panel 28 is made from polyester and the hole size is approximately 1 cm×1 cm. A plurality of openings 32 are opened at the periphery of the security net 22. Each security lock 24 is adapted to couple to one of the openings 32 and also adapted to lock to a pallet 25 beneath the security net 22. The security locks 24 are provided in a predetermined set, and each individual security lock 24 has a first identifier for a user or a machine to identify whether the security locks 24 belong to the predetermined set or not. The first identifier will be described in more detail below.

During cargo transportation, the cargo is set onto the pallet 25 and covered by both the security net 22 and a cargo net. The cargo net may be a conventional network of fabric bands that are used to hold the cargo in place, and contain large open areas. The security net 22 can be either inside or outside the cargo net. Both the security net 22 and the cargo net is then locked to the pallet 25. As mentioned above, the panel 28 of the security net 22 is made in a manner such that foreign objects cannot be readily inserted through the security net 22 to the cargo. The security net 22 must be torn open before a foreign object can be inserted through the security net 22. The net shape ensures a user can still see the cargo inside while covered. The security locks 24 prevent the foreign object to be inserted at the gap between the security net 22 and the pallet 25. The openings 32 of the security net 22 are also sufficiently small to prevent foreign objects to be inserted therethrough. As such, the system 20 as a whole prevents access to the cargo during transportation from one place to another.

Figure 2:
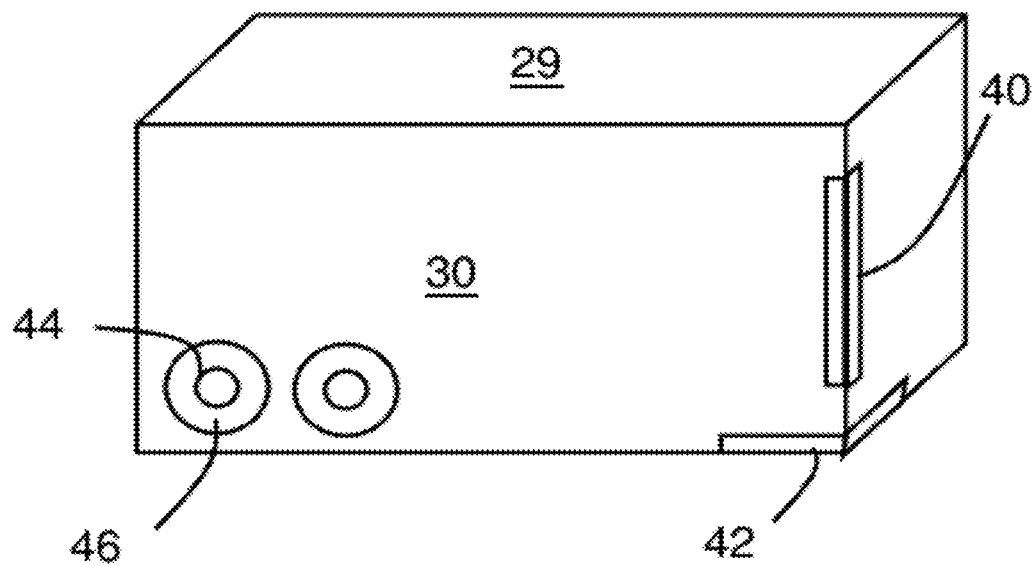
FIG. 2 is a perspective view of a security net according to an embodiment of the present invention.

FIG. 2 shows a perspective view of the security net 22 according to an embodiment of the present invention. The panel 28 comprises a top surface 29 and a plurality of side surfaces 30. The panel 28 is in one piece, meaning that seams are absent between the surfaces. The top surface 29 and the plurality of side surfaces 30 define a space therein for the cargo to be covered. A plurality of elastic bands 40 are provided on the panel 28 to allow the security net 22 to accommodate to a range of cargo sizes by stretching or contracting the elastic bands 40. In an exemplary embodiment, the elastic bands 40 are running substantially vertically at an edge between adjacent side surfaces 30. This orientation of the elastic bands 40 allow the security net 22 to accommodate to a range of cargo heights. An elastic bank 42 running along the horizontal direction is also provided at each bottom corner of the security net 22. The elastic bank 42 stretches across the bottom edges of two adjacent side surfaces 30 for securing the cargo more tightly at the corners when the elastic bank 42 contracts. In one embodiment, the panel 28 with the elastic bands 40 and elastic banks 42 are all black in color for easy identification of any tears.

Referring again to FIG. 2, a metal rim 44 made of for example copper is disposed along the edge of the opening 32. The metal ring 44 is further surrounded by a plastic disc 46 at both sides of the security net 22. The metal ring 44 and the plastic disc 46 reinforces the security net 22 at the openings 32 to ensure that the security net 22 would not be easily torn at the openings 32 during daily operation.

Figure 3A:
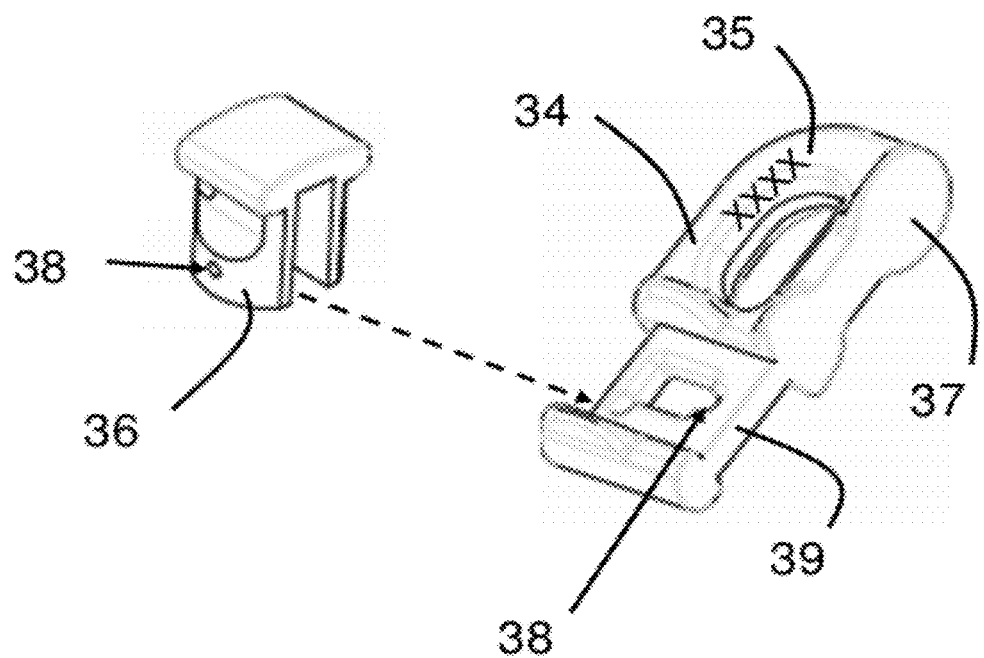
FIG. 3a is an exploded diagram of a security lock according to an embodiment of the present invention.

FIG. 3a shows an exploded diagram of a security lock 24 according to an embodiment of the present invention. The security lock 24 comprises a locking member 34 and a latch 36 adapted to attach to a neck 39 of the locking member 34. The locking member 34 comprises a protruding portion 37 for locking onto a track of the pallet 25. The latch 36 is adapted to be only attachable to the locking member 34 when the locking member 34 is at a locking position to the pallet 25. The locking mechanism between the security lock 24 and the pallet 25 is described below.

Figure 3B:
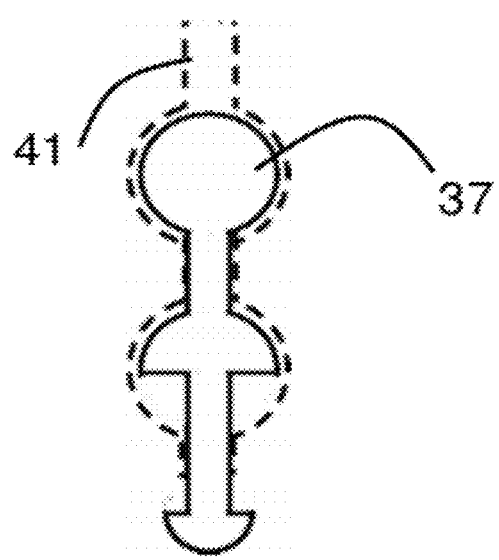
FIG. 3b shows a security lock and a track of a pallet at a releasable position.
Figure 3C:
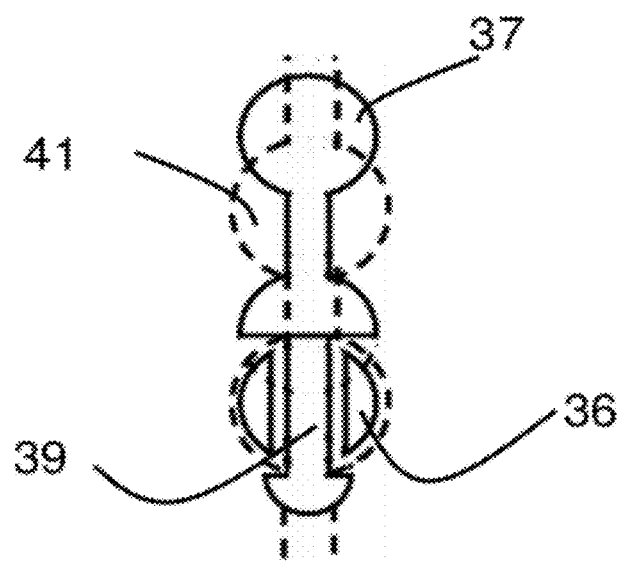
FIG. 3c shows the security lock and the track of the pallet at a locked position.

FIGS. 3b and 3c shows the security lock 24 and the pallet 25 at a releasable position and at the locked position respectively. At the releasable position, the contour of the protruding portion 37 of the locking member 34 follows the contour of the track 41 of the pallet 25 (shown in dashed lines), meaning that the protruding portion 37 can be inserted into the track or released from the track 41. The latch 36 has a same contour as the protruding portion 37 of the locking member displaced by approximately half a unit distance, therefore the latch 36 cannot attach to the neck portion 39 and engage to the pallet 25. When the locking member 34 moves along the track 41 for approximately half a unit distance, the latch 36 can then be attached to the neck portion 39, while the protruding portion 37 is locked inside the track 41.

A seal opening 38 is opened at both the locking member 34 and the latch 36 to allow a sealing device to seal them together at the locking position. When the security lock 24 is sealed, the sealing device prevents the latch 36 to separate from or move relative to the locking member 34, in turn preventing the locking member 34 from displacing from the locking position during cargo transportation.

One kind of tampering that may happen to the cargo is that the whole security lock 24 is broken such that a foreign object (e.g. bomb) can be inserted into the cargo area. The broken lock is then replaced by a new lock to avoid detection of tampering. One way to alert a user that the security lock 24 is being tampered with is by providing a first identifier 35 to each security lock 24. In an exemplary embodiment as shown in FIG. 3a, the first identifier 35 is a serial number printed on a surface of the security lock 24 by, for example laser printing. Each security lock 24 belonging to a predetermined set has a matching first identifier 35, for example the serial number being the same or follows a predetermined pattern.

Figure 4:
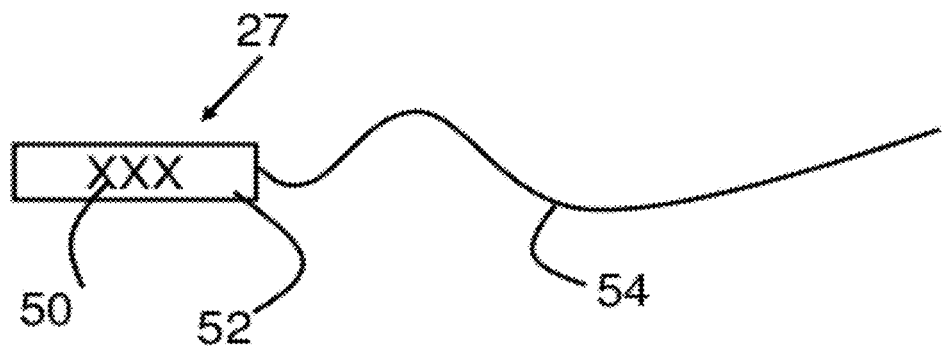
FIG. 4 is a diagram of a sealing device according to an embodiment of the present invention.

FIG. 4 shows a sealing device 27 according to an exemplary embodiment of the present invention. In this embodiment, the sealing device 27 is a wire seal having a sealing portion 52 and a wire portion 54. The wire portion 54 is adapted to insert through the seal openings 38 of each of the security locks 24 and seal to the sealing portion 52, linking the security locks 24 together at the same time. In other words, the wire seal is common to each of the security locks 24. In an exemplary embodiment, a second identifier 50 is provided on the sealing portion 52 for identifying whether the sealing device 27 belong to the same predetermined set as the security locks 24.

Figure 5:
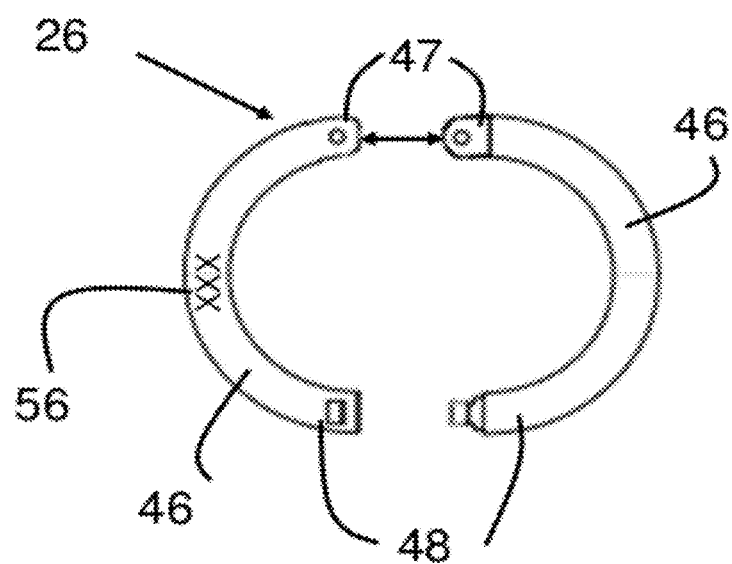
FIG. 5 is a top view of a coupling device according to an embodiment of the present invention.

In an exemplary embodiment, the security lock 24 is coupled to the security net 22 through a coupling member 26. FIG. 5 shows a coupling member 26 according to an exemplary embodiment of the present invention. The coupling member 26 is in the form of a snap ring having two half-rings 46 initially at an open position. At the open position, the two half-rings 46 are permanently and pivotally connected at a pivot end 47 and have an irreversible snapping portion 48 at the other end. The coupling member 26 is inserted through one of the openings 32 and a locking bolt of the security lock 24 before snapping the snapping portions 48 together to move to an irreversible closed position. When the snapping portions 48 of the two half-rings 46 are snapped together, a permanent closed structure is formed, and as the snapping is irreversible, the security lock 24 is not separable from the security net 22 without damaging the coupling member 26, therefore any unauthorized opening of the coupling member 26 will be easily noticed.

In an exemplary embodiment, a third identifier 56 is provided to each coupling member 26. In an exemplary embodiment, the second identifier 56 is a serial number printed on a surface of the coupling member 26 by for example laser printing. Each coupling member 26 belonging to the same predetermined set as the security locks 24 and the sealing device 27 as described above has a matching third identifier 56, for example the serial number being the same or follows a predetermined pattern.

In a specific embodiment, the first identifier 35, the second identifier 50 and the third identifier 56 are identical serial numbers. Only the parts that have such a serial number printed thereon will be regarded as belonging to the predetermined set.

In an exemplary embodiment, the cargo will be deemed to be have been tampered with not only when the security net 22 is torn, or any of the security locks 24 or the coupling members 26 are damaged or broken, but also when the identifiers of each part do not match. For example, if the security net 22 or the security locks 24 are not integral, or if the serial number of one security lock is found to be different from that of other security locks and the wire seal, the user will be alerted that the cargo has been tampered with and act accordingly, for example performing a thorough check on the cargo and installing a whole new set of security locks. Each set of parts having a same identifier will only be used once before disposing.

In one embodiment, the security locks 24 and the coupling members 26 are made of a plastic material. The plastic material is easily distinguishable from metal security locks used for securing the cargo net to prevent the two kinds of security locks being mixed up. The plastic material is also recyclable. In an exemplary embodiment, the plastic material is white in color.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the sealing device 27 does not need to be common to all security locks 24. It is obvious to one skilled in the art that individual sealing devices 27 can be applied to individual security locks 24 and function similarly.

The first identifier 35, the second identifier 50 and the third identifier 56 can be the same or different types of identifiers, for example a serial number as mentioned above, or it can be a barcode, an RFID, or other identifiers that allow a user to identify using human eyes or through a specific machine.

Additional signs can be attached to the security net 22. The sign is first printed on a plastic sheet then attached to the security net using conventional methods.

What is claimed is:

1. A system for preventing access to cargo during transportation, comprising:
    a) a security net adapted for covering said cargo, said net comprising a panel with a periphery; said panel made from a net with holes of sufficiently small size to prevent objects from readily being inserted therethrough without causing a tear thereto; said periphery containing a plurality of openings; and
    b) a plurality of security locks adapted for locking onto a pallet beneath said cargo and coupling onto one of said plurality of openings to prevent objects from being inserted through a gap between said security net and said pallet, each security lock having a first identifier for identifying whether said plurality of security locks belong to a predetermined set.

2. The system according to claim 1, further comprising a plurality of coupling members, each coupling member coupling one of said plurality of security locks to one of said plurality of openings, each coupling member having a second identifier for identifying whether said plurality of coupling members belong to said predetermined set.

3. The system according to claim 2, wherein each said coupling member is in an open position before use and is adapted to close to an irreversible closed position to ensure detection of any unauthorized opening.

4. The system according to claim 1, further comprising a sealing device common to said plurality of security locks, said sealing device having a second identifier for identifying whether said sealing device belongs to said predetermined set.

5. The system according to claim 1, wherein said plurality of security locks are made of a plastic material.

6. The system according to claim 1, wherein said openings of said security net are uniformly distributed along said periphery of said security net.

7. The system according to claim 1, wherein said security net further comprises a plurality of elastic bands on said panel, and comprises a plurality of elastic banks bands along said periphery.

8. The system according to claim 1, wherein said security net further comprises a metal rim disposed along an edge of each said opening, and a plastic disc surrounding said metal rim.

9. The system according to claim 1, wherein the system further includes a second identifier and a third identifier and further wherein said first identifier, said second identifier and said third identifier are serial numbers.

10. The system according to claim 9, wherein the system further includes a plurality of coupling members with serial numbers, at least one sealing device with a serial number and further wherein said plurality of coupling members, said plurality of security locks and said sealing device belong to said predetermined set when said serial numbers of said plurality of coupling members, said plurality of security locks and said sealing device are identical.

* * * * *